United States Patent [19]

Rehwald et al.

[11] Patent Number: 4,760,521

[45] Date of Patent: Jul. 26, 1988

[54] ARBITRATION SYSTEM USING CENTRALIZED AND DECENTRALIZED ARBITRATORS TO ACCESS LOCAL MEMORIES IN A MULTI-PROCESSOR CONTROLLED MACHINE TOOL

[75] Inventors: James E. Rehwald, Rockford; Martin L. Wilson, Belvidere, both of Ill.

[73] Assignee: White Consolidated Industries, Inc., Cleveland, Ohio

[21] Appl. No.: 799,174

[22] Filed: Nov. 18, 1985

[51] Int. Cl.⁴ .................. G06F 15/16; G06F 13/00
[52] U.S. Cl. .................................. 364/200; 364/474
[58] Field of Search ... 364/200 MS File, 900 MS File, 364/474

[56] References Cited

U.S. PATENT DOCUMENTS

| | | | |
|---|---|---|---|
| 3,510,844 | 5/1970 | Aranyi et al. | 364/200 |
| 3,710,349 | 1/1973 | Miwa et al. | 364/200 |
| 3,761,879 | 9/1973 | Brandsma et al. | 364/200 |
| 4,096,571 | 6/1978 | Vandermey | 364/200 |
| 4,099,233 | 7/1978 | Barbagelata et al. | 364/200 |
| 4,099,236 | 7/1978 | Goodman et al. | 364/200 |
| 4,209,839 | 6/1980 | Bederman | 364/200 |
| 4,219,873 | 8/1980 | Kober et al. | 364/200 |
| 4,228,495 | 10/1980 | Bernhard et al. | 364/474 X |
| 4,314,335 | 2/1982 | Pezzi | 364/200 |
| 4,368,514 | 1/1983 | Persaud et al. | 364/200 |
| 4,456,951 | 6/1984 | Henneberger et al. | 364/200 X |
| 4,470,114 | 9/1984 | Gerhold | 364/200 |
| 4,481,578 | 11/1984 | Hughes et al. | 364/200 |
| 4,493,022 | 1/1985 | Nicolas et al. | 364/200 |
| 4,495,567 | 1/1985 | Treen | 364/200 |
| 4,499,538 | 2/1985 | Finger et al. | 364/200 |
| 4,556,939 | 12/1985 | Read | 364/200 |
| 4,571,672 | 2/1986 | Hatada et al. | 364/200 |
| 4,621,342 | 11/1986 | Capizzi et al. | 364/900 |

Primary Examiner—Archie E. Williams, Jr.
Assistant Examiner—Danh Phung
Attorney, Agent, or Firm—Jenner & Block

[57] ABSTRACT

An arbitration system for a machine tool control has multiple processors and a local memory associated with each processor. The arbitration system allows one processor to access data stored in a foreign memory, i.e. the local memory of a second processor so that the time required for one processor to gain access to data used by another processor is relatively short. The system includes an external arbitration control which arbitrates requests for access to a foreign memory from each of the processors. The system also includes a plurality of local arbitrators each associated with a particular processor to arbitrate requests for access to its processor's bus and memory from a plurality of users including the external arbitration control, a DRAM controller and a direct memory access controller.

12 Claims, 10 Drawing Sheets

ARBITRATION SYSTEM USING CENTRALIZED AND DECENTRALIZED ARBITRATORS TO ACCESS LOCAL MEMORIES IN A MULTI-PROCESSOR CONTROLLED MACHINE TOOL

BACKGROUND OF THE INVENTION

1. Field of the Invention

The present invention relates to an arbitration system for a machine tool control having multiple processors and a local memory associated with each processor and more particularly to such an arbitration system which allows one processor to access the local memory of a second processor.

2. Description of the Related Art

Multi-processor control systems typically include a local memory associated with each processor for storing data used only by that processor. Such systems also include a global memory for storing all data which is used by more than one of the processors. Access to the global memory is gained through a global arbitrator which allows only one processor to have access at a time. Because most of the data used by the processors is stored in the global memory, the demand for access thereto is extremely high with a bottleneck typically forming at the arbitrator. Whereas a processor's access to its local memory is fast in such systems, access to data stored in the global memory is relatively slow.

SUMMARY OF THE INVENTION

In accordance with the present invention, the disadvantages of prior multi-processor control systems employing global memories as discussed above have been overcome. The arbitration system of the present invention eliminates the need for a global memory by allowing one processor to access the local memory of another processor.

The control system of the present invention includes a plurality of processors each having an associated local memory. Each of the processors also has an address decoder associated therewith for monitoring the addresses output by the processor to determine if an address is outside its processor's local memory or not. The address decoders provide a foreign memory select signal if an address is outside its associated processor's memory wherein the select signal identifies the processor providing the address and the foreign memory. An external bus arbitration system is responsive to the foreign memory select signals from each of the address decoders for arbitrating foreign memory access to allow one processor to access the local memory of a second processor. In order to allow a first processor to access the second processor's local memory, the external bus arbitration system provides a user request signal to the second processor. If the second processor does not need its memory at the time it receives the access request, the second processor transmits an access grant signal to the external bus arbitration system. In response to the access grant signal, the external bus arbitration system couples the addressed data from the second processor's memory to the first processor's memory by connecting the local address and data buses of each processor.

The arbitration system of the present invention also includes a plurality of local bus arbitrators each of which is associated with a particular processor to allow other users in addition to the external bus arbitration system to access the local memory of the processor. One such user is a memory refresh controller which is coupled to a processor's memory to periodically refresh the memory. Another user is a direct memory access controller which may be coupled to the memory of a particular processor to gain access to the data stored therein in order to carry out particular control functions. The memory refresh and direct memory access controllers generate user access request signals which, along with the access request signal from the external bus arbitration system, are coupled to the local bus arbitrator associated with the processor whose memory is requested. In response to one or more access requests, the local bus arbitrator transmits an access request to its associated processor. If the processor does not need its memory at the time it receives a request, the processor grants the access request to the local bus arbitrator which responds by granting access to the requesting user having the highest priority.

Because the global memory of the prior art is eliminated, data may be allocated to the local memories in the present invention such that the data is stored in the memory whose processor uses it the most. A bottleneck at the external bus arbitration system is thus prevented and the time required for one processor to gain access to data used by another processor is greatly reduced.

These and other objects and advantages of the invention, as well as details of an illustrative embodiment, will be more fully understood from the following description and the drawings.

DESCRIPTION OF THE PREFERRED EMBODIMENTS

Figure 1:
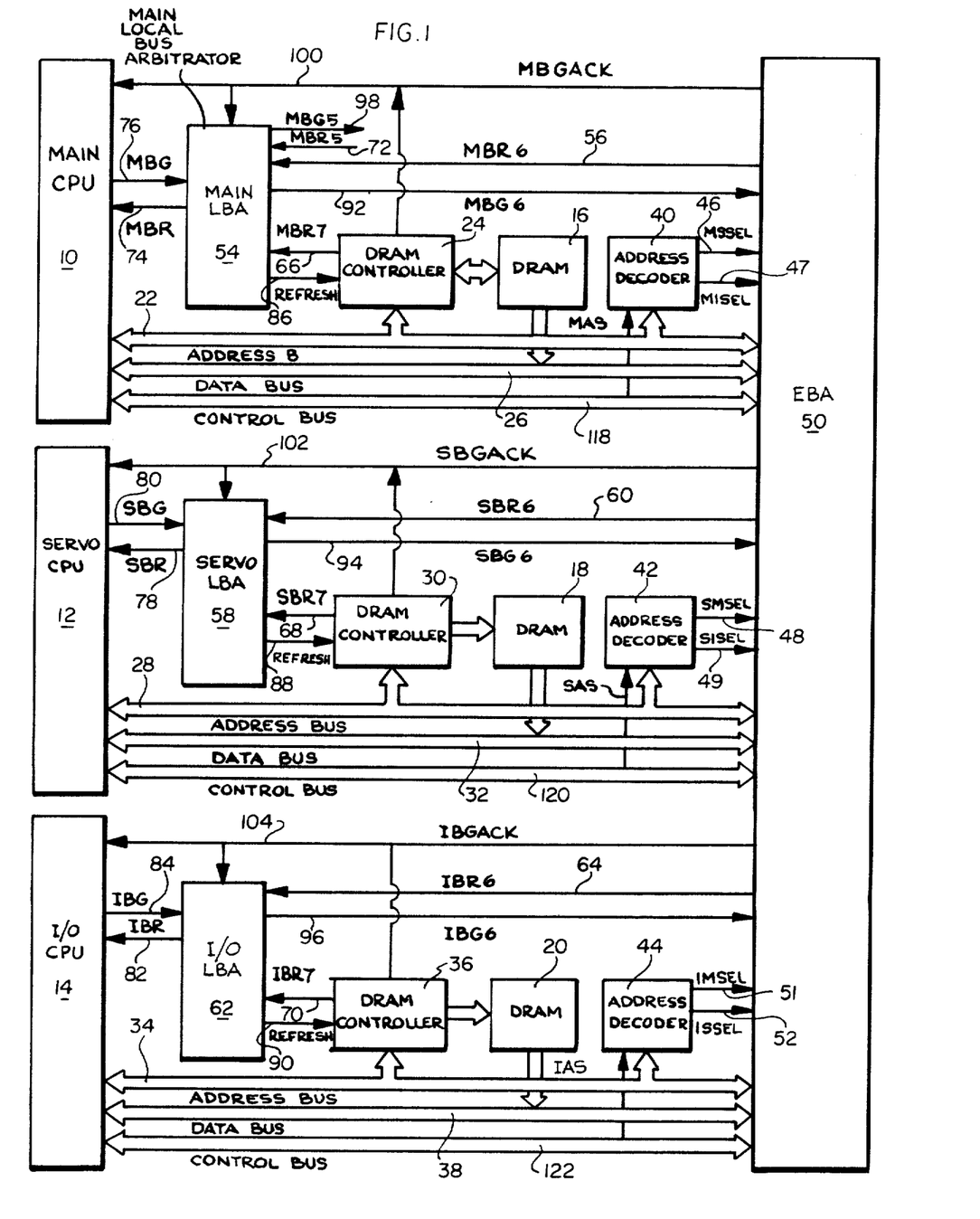
FIG. 1 is a block diagram illustrating the arbitration system of the present invention.

The arbitration system of the present invention is illustrated in FIG. 1 for a machine tool control having a Main processor 10, a Servo processor 12 and an Input-/Output processor 14. The Main processor 10 converts part programs for the control of the machine tool operations to machine language for use by the Servo processor 12 and the Input/Output processor 14. The Main processor 10 also performs various supervisory functions. The Servo processor 12 controls machine motion statements for translational and rotational movement of the machine tool. The Input/Output processor 14 controls various on-off machine tool functions such as the operation of coolant pumps, etc.

Each processor has an associated local memory for storing data which is either used solely by its processor or which is used by its processor more than the other processors. The local memory of the Main processor 10 is a dynamic random access memory, DRAM, 16. A DRAM 18 forms the local memory of the Servo processor 12 and a DRAM 20 forms the local memory of an Input/Output processor 14. The Main processor 10 addresses data stored in its DRAM 16 by outputting an address on an address bus 22 which is coupled to the DRAM through a DRAM controller 24. The DRAM 16 responds to an address by outputting data to the processor on a data bus 26. The Servo processor 12 addresses its DRAM 18 by means of an address bus 28 and a DRAM controller 30, the DRAM 18 responding by outputting data on a data bus 32. Similarly, the Input/Output processor 14 addresses its DRAM 20 by means of an address bus 34 and a DRAM controller 36, the DRAM 20 responding by outputting data on a data bus 38. The DRAM controllers 24, 30 and 36 periodically access the respective DRAMs 16, 18 and 20 to refresh the data stored therein as well as coupling addresses from the respective buses 22, 28 and 34 to each of the DRAMs.

In order to enable data stored in a memory to be addressed by any of the three processors, the data is stored in each DRAM 16, 18 and 20 at unique addresses. For example, the DRAM 16 may utilize addresses 0 to one less than 20,000 hex; the DRAM 18 may utilize addresses from 20,000 hex to one less than 40,000 hex, and the DRAM 20 may utilize addresses from 40,000 hex to one less than 60,000 hex. It is noted, however, that each DRAM could use its entire memory by providing an appropriate software switch.

Each of the processors 10, 12 and 14 has an associated address decoder 40, 42 and 44 for monitoring the addresses output on the respective address buses 22, 28 and 34 to determine whether an address on the bus is outside of the decoder's associated processor's memory. If an address is outside of the processor's memory, the address decoder generates a foreign memory select signal which identifies its processor and the foreign memory storing the addressed data. For example, if the Main processor 10 outputs an address on bus 22 which corresponds to data stored in the Servo processor's DRAM 18, the address decoder 40 outputs a Main to Servo select signal, MSSEL, on a line 46 to the external bus arbitration system, EBA, 50. If the Main processor 10 tries to address data in the Input/Output processor's DRAM 20, the address decoder 40 outputs a Main to Input/Output select signal, MISEL to the EBA 50 on line 47. The address decoder 42 outputs a Servo to Main select signal, SMSEL, on line 48 to the EBA 50 if the Servo processor 12 addresses data stored in the Main processor's DRAM 16 and the decoder 42 outputs a Servo to Input/Output select signal SISEL on line 49 to the EBA 50 if the Servo processor addresses data stored in DRAM 20. When the Input/Output processor addresses data stored in the Main processor's DRAM 16, the address decoder 44 outputs an Input/Output to Main select signal, IMSEL to the EBA 50 on line 51 and the decoder 44 outputs an Input/Output to Servo select signal ISSEL on line 52 to the EBA 50 when the Input/Output processor addresses the Servo's DRAM 18.

The external bus arbitration system, EBA 50 is responsive to each of the foreign memory select signals output from the address decoders 40, 42 and 44 on lines 46–49 and 51–52 for arbitrating foreign memory access requests to allow one of the processors to access the memory of another of the processors. The EBA 50 allows the one processor to access the memory of a second processor by providing a foreign memory access request signal to the second processor through a local bus arbitrator, LBA, associated with that processor. More specifically, if either the Servo processor 12 or the Input/Output processor 14 requests access to the Main processor's DRAM 16, the EBA 50 transmits a request, MBR6, to the Main processor's local bus arbitrator, LBA, 54 on line 56. If either the Main processor or the Input/Output processor requests access to the Servo processor's DRAM 18, the EBA 50 transmits a request, SBR6 to the Servo processor's LBA 58 on line 60. Similarly, if either the Main processor 10 or the Servo processor 12 requests access to the Input/Output processor's DRAM 20, the EBA 50 transmits a request IBR6, to the Input/Output processor's LBA 62 on line 64.

The local bus arbitrator associated with each processor arbitrates among local users of the processor's bus to allow one user to access the processor's memory if the processor does not need it. Users, among whom each of the LBAs arbitrate request from, include the EBA 50 and the DRAM controllers. The DRAM controllers 24, 30 and 36 output user access request signals MBR7, SBR7 and IBR7 on respective lines 66, 68 and 70 to the respective LBAs 54, 58 and 62 when the controllers need access to their associated DRAMs for refreshing the DRAMs. Another user, which is not shown, may be a direct memory access controller or DMA. A DMA controller, may for example, be coupled to each bus associated with the Main processor in order to access the Main processor's DRAM 16 directly or to access one of the other DRAMs 18 or 20 through the EBA. The DMA controller would provide a user access request signal, MBR5, on a line 72 to the Main processor's LBA 54 when access to the Main processor's bus is desired. Once granted access, the DMA controller would provide on the bus 22 an address to address data in the DRAM 16 or an address to address data stored in the Servo or Input/Output DRAMs through the EBA 50.

The local bus arbitrators arbitrate local memory access requests by passing a bus grant from their associated processor to the highest priority requesting user. Requests from the DRAM controllers 24, 30 and 36 have the highest priority so that these requests are always selected over requests from other users. The next highest priority requests are from the EBA system 50 to allow one of the Main, Servo or Input/Output processors to access one of the other processor's memories. After the EBA 50, a DMA controller, if used, would have the next highest priority. When a request for access is received by an LBA from one or more users, the LBA transmits a reqeust to its associated processor to see if the processor needs its memory or not. If the processor does not need its memory, it transmits a bus access grant back to the LBA. More specifically, the Main LBA 54 transmits a bus request, MBR, on a line 74 to The Main processor 10 which responds by transmitting a bus access grant, MBG, to the Main LBA on line 80 if the processor 12 does not need its memory. Similarly, the Input/Output LBA 62 transmits a bus request, IBR, on a line 82 to the Input/Output processor 14 and the processor 14 responds by transmitting a bus access grant to the LBA 62 on line 84 if the processor 14 does not need its memory.

As discussed above, the LBAs 54, 58 and 62 respond to a bus grant from their respective processors by transmitting a bus grant to the highest priority user. the Main, Servo and Input/Output LBAs transmit bus grants to the DRAM controllers 24, 30 and 36 on respective refresh lines 86, 88 and 90. The LBAs 54, 58 and 62 transmit bus grants to the EBA 50 on respective lines 92, 94 and 96; whereas, a bus grant to a DMA controller from the Main LBA 54 would be transmitted thereto on a line 98.

Once a user has been granted access to a processor's bus and memory, that user must transmit a bus grant acknowledge, xBGACK, to the LBA and processor granting access. Specifically, if either the EBA 50 or DRAM controller 24 is granted access to the Main processor's bus and DRAM 16, the one granted access transmits the control signal MBGACK on line 100 to the Main processor 10 and LBA 54. If either the EBA 50 or DRAM controller 30 are granted access to the Servo processor's bus and DRAM 18, the one granted access transmits the control signal SBGACK on line 102 to the Servo processor 12 and the LBA 58. Similarly, if the EBA 50 or the DRAM controller 36 are granted access to the Input/Output processor's bus and DRAM 20, the one granted access transmits the control signal IBGACK on line 104 to the Input/Output processor 14 and the Input/Output LBA 62.

If the EBA transmits a bus request to the LBA of one processor and does not gain access because another user owns that processor's bus, the EBA waits until the current bus master is off the bus. During that time the EBA 50 monitors the foreign memory select signals on lines 46-49 and 51-52 to determine whether the one processor, whose memory the EBA is trying to access, is also trying to access a foreign memory itself. If so, the EBA 50 transmits halt control signals on the one processor's control bus 118, 120 or 122 to force the one processor off its bus until the EBA has finished accessing the processor's memory.

Figure 2A:
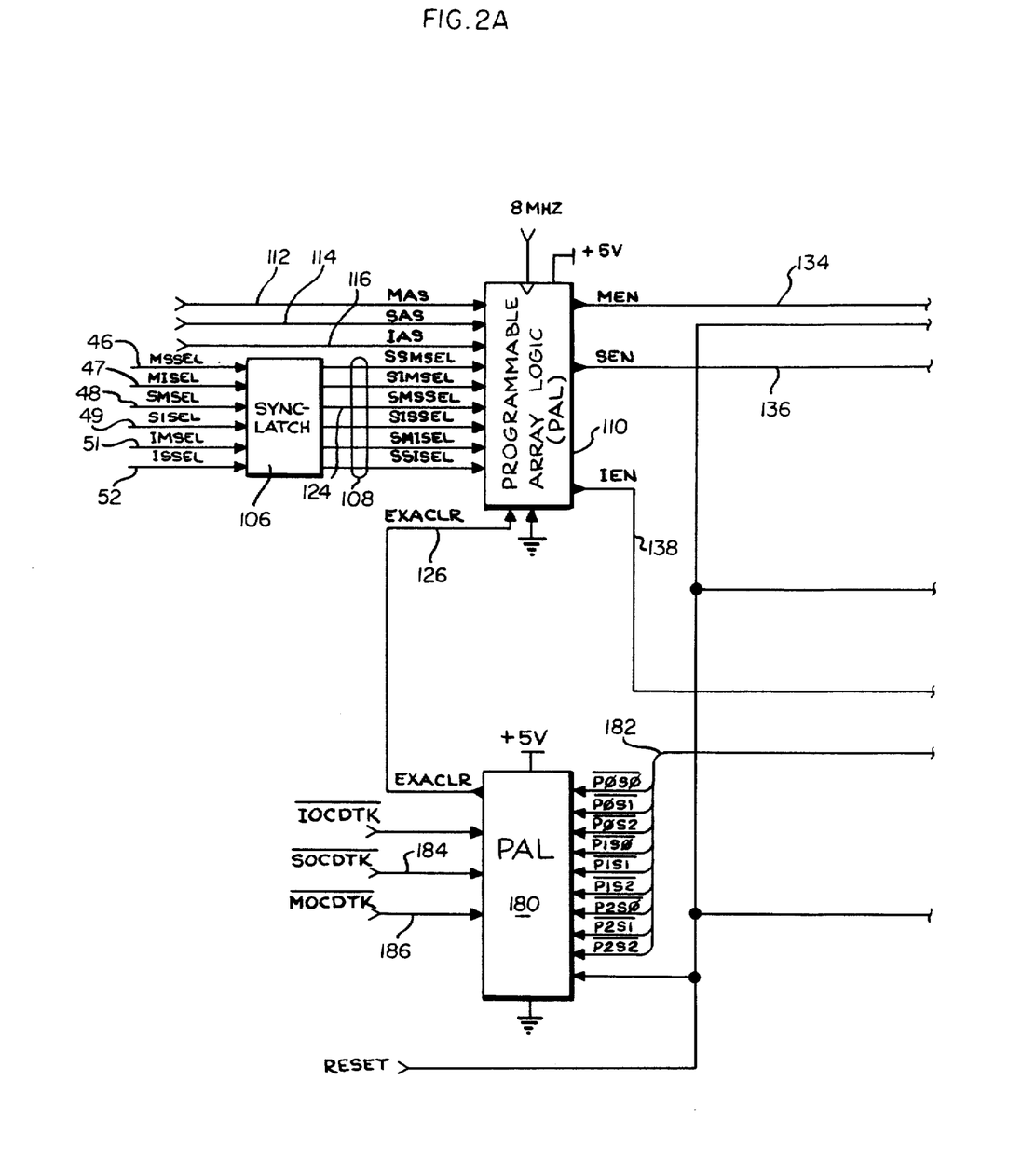
FIGS. 2A-2C are schematic diagrams of the external bus arbitration system shown in FIG. 1.
Figure 2B:
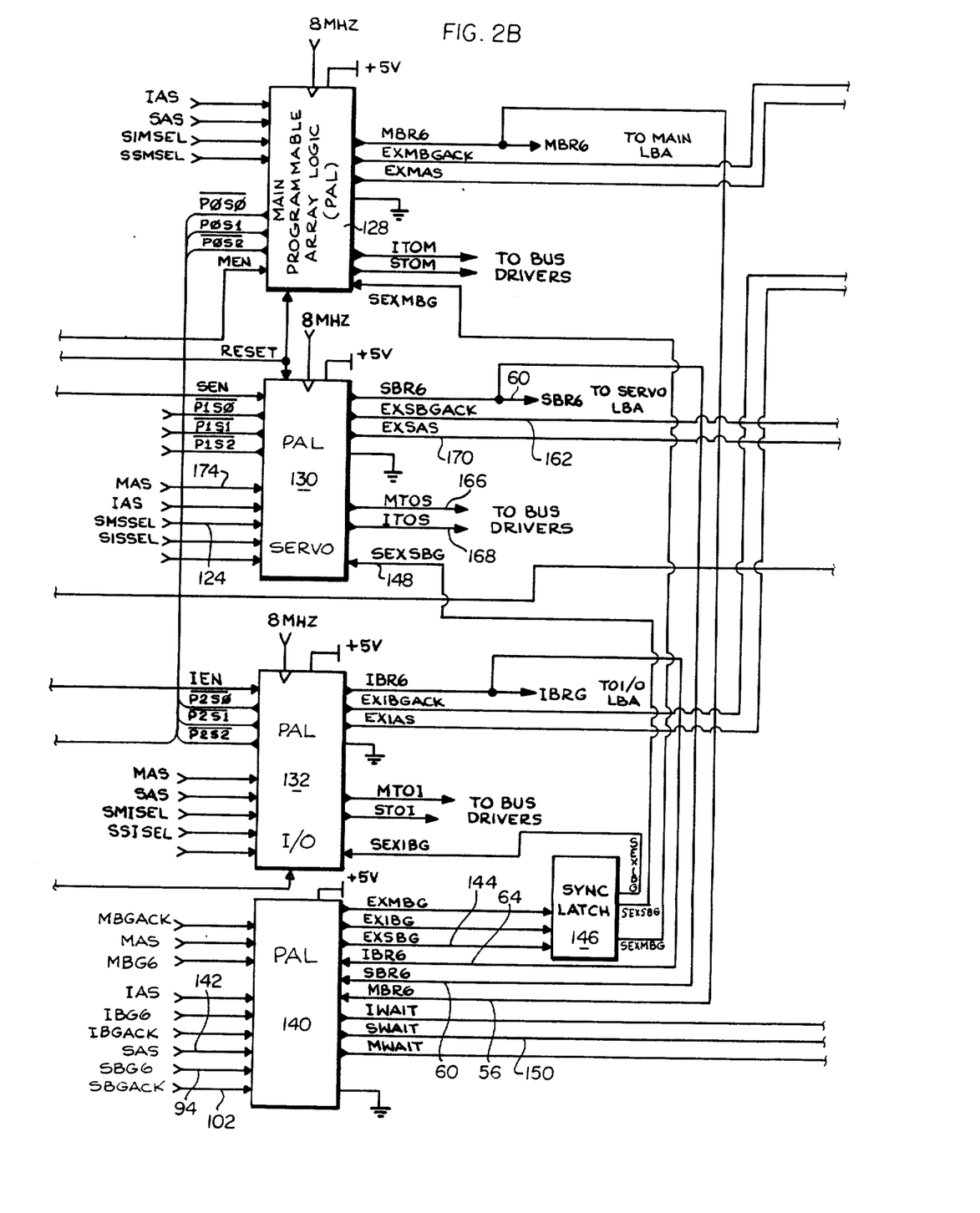
Figures 2C, 3:
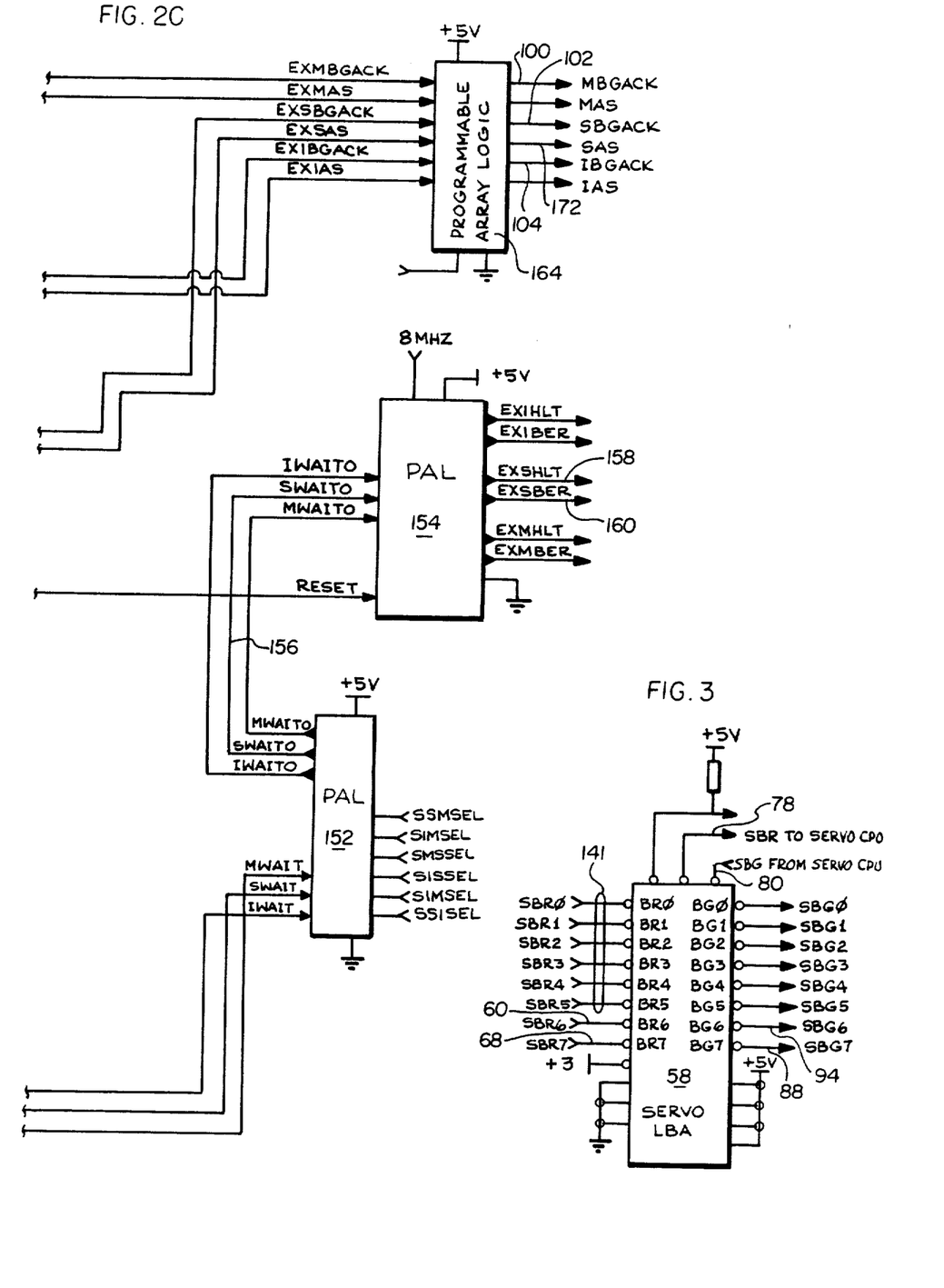
FIG. 3 is a schematic of a local bus arbitrator shown in FIG. 1.

The EBA system 50 is shown in detail in FIGS. 2A-2C. As shown in FIG. 2A, the foreign memory select signals on lines 46-49 and 51-52 are applied to a sync latch 106 to synchronize the select signals for use by the EBA system 50. The sync latch 106 periodically samples the asynchronous foreign memory select signals in synchronism with an 8 Mhz signal from the system clock to provide stable outputs to the EBA 50. The synchronized foreign memory select signals output from the latch 106 on lines 108 are applied to programmable array logic, PAL 110. Also input to the PAL 110 on respective lines 112, 114 and 116 are address strobe signals, MAS, SAS and IAS which are coupled to the PAL from the control buses 118, 120 and 122 of the respective Main, Servo and Input/Output processors.

During the first phase of the EBA system 50, the Request Monitor Phase, the PAL 110 arbitrates valid requests for access to a foreign memory if there is not a foreign access already ongoing. A request from one processor to address the memory of another processor, as indicated by the foreign memory select signals on lines 108, is valid if the address strobe signal for the one processor is active. For example, if the Main processor requests access to the DRAM 18 of the Servo processor 12, the SMSSEL signal on line 124 will be active as well as the Main address strobe, MAS, on line 112. If the foreign memory select signal, SMSSEL is active and the address strobe MAS on line 112 is not active, the request is invalid. In order to determine whether a foreign memory access is ongoing, the PAL 110 monitors the EXACLR signal on line 126. EXACLR is activated by a PAL 180 when each of the Main, Servo and Input/Output PALs 128, 130 and 132 are idle. As soon as one of the PALs 128, 130 and 132 leaves the idle state, indicating that a foreign access is ongoing, EXACLR is deactivated. EXACLR insures that only one foreign memory access occurs at a time. When EXACLR is active, PAL 110 scans the foreign memory select signals on lines 108 and arbitrates valid requests to provide an enable signal MEN, SEN, or IEN to the respective Main, Servo or Input/Output processor PAL 128, 130 or 132 associated with the foreign memory and bus to which access is requested and which request is passed by the PAL 110. When one of the Main, Servo or Input/Output processor PALs 128, 130 or 132 is enabled, the EBA 50 enters a second phase, the external bus request or EBR phase.

Each of the PALs 128, 130 and 132 associated with the respective Main, Servo and Input/Output processors are identical. Therefore, for simplicity, only one foreign memory access will be described in which the Main processor 10 accesses the DRAM 18 of the Servo processor 12. If a valid request from the Main processor 10 to access the DRAM 18 of the Servo processor 12 is received by the PAL 110 when EXACLR is active and PAL 110 determines this request has the highest priority, the PAL will activate the Servo enable SEN on line 136 coupled to the Servo PAL 130. When the Servo PAL 130 is enabled by SEN, the PAL leaves its idle state so that EXACLR on line 126 is deactivated and the EBA 50 enters the EBR phase. The PAL 130, as discussed in detail below with reference to FIG. 9, activates a bus request SBR6 on line 60 when the PAL is enabled. The Servo bus request, SBR6 is coupled to the Servo LBA 58 as shown in detail in FIG. 3 and to a PAL 40 shown in detail in FIG. 6.

The Servo LBA 58, as shown in FIG. 3, arbitrates requests for access to the Servo bus and DRAM 18 as indicated by the bus requests on lines 141, 60 and 68. In response to the Servo bus request, SBR6, from the PAL 130 on line 60, the Servo LBA activates the Servo bus request, SBR, coupled to the Servo CPU 12 on line 78. If the Servo processor 12 does not need the DRAM 18, the processor activates a bus grant on line 80 coupled to the LBA 58. In response to the bus grant on line 80, the Servo LBA 58 activates SBG6 on line 94 coupled to PAL 140 if the request from the EBA 50 is the highest priority request received.

The PAL 140 transmits an external bus grant signal to one of the PALs 128, 130 or 132 when a bus grant is received from the PAL's respective LBA, 54, 58 or 62 and the corresponding address strobe and bus grant acknowledge signals indicate that the current bus cycle for the processor whose memory is being accessed is complete and there is no other master on that processor's bus. In the above example, if SBG6 on line 94 is active and the address strobe signal SAS and bus grant acknowledge signal SBGACK on respective lines 142 and 102 indicate that the current bus cycle of the Servo processor has been completed and no other master currently owns the Servo bus, the PAL 140 activates EXSBG on a line 144 coupled to a sync latch 146. The latch 146 synchronizes the inputs applied thereto to the 8 Mhz system clock to provide synchoronized external bus grants to the Main, Servo and Input/Output PALs 128, 130 and 132. In response to the EXSBG signal on line 144, the latch 146 activates a synchronized external bus grant SEXSBG on line 148 coupled to the Servo PAL 130. In response to the synchronized external bus grant signal on line 148, the Servo PAL 130 enters a connection access phase as discussed in detail below.

When the PAL 140 has received a bus request but it cannot activate an external bus grant signal because the current bus cycle for the processor whose memory is being accessed is not complete and there is another master on that processor's bus, PAL 140 activates an xWAIT signal and waits for the current bus master to get off the bus. For example, if the bus request for the Servo processor's memory, SBR6 is active on line 60 but the external bus grant, EXSBG cannot be activated by the PAL 140, because, for example the DRAM controller 30 owns the Servo bus, PAL 140 activates SWAIT on line 150 to a PAL 152 and then waits.

PAL 152 determines whether one of the processors is trying to access the bus and memory of another processor while the other processor is also trying to access a foreign memory. If so, the PAL 152 activates an xWAITO signal coupled to a PAL 154. If for example, SWAIT, coupled to PAL 152, is active and the synchronized foreign memory select signal SSISEL is active indicating that the Servo processor is trying to access data stored in the Input/Output processor's memory 20, PAL 152 responds by issuing SWAITO on line 156 to the PAL 154. In response to the SWAITO signal, PAL 154 activates EXSHLT and EXSBER on lines 158 and 160 to force the Servo processor off its bus so that the Main processor can complete its access of the Servo processor's memory. The PALs 152 and 154 operate to force one processor off its bus if it is trying to access a foreign memory when PAL 110 has already activated an enable to allow another processor to access the memory of that one processor.

When a synchronized external bus grant is received by one of the Main, Servo or Input/Output PALs 128, 130 or 132 from the sync latch 146, the EBA system 50 enters the connection access phase during which the EBA transmits the bus grant acknowledge signal to the processor and LBA granting the bus. For example, in response to the synchronized external bus grant signal SEXSBG on line 148, the Servo PAL 130 activates EXSBGACK on a line 162 coupled to a PAL 164. The PAL 164 is responsive to the activation of EXSBGACK to transmit the bus grant acknowledge signal, SBGACK on line 102 to the Servo LBA 58 and the Servo processor 12. In response to the SEXSBG signal on line 148, the Servo PAL 130 also activates either a Main to Servo drive signal, MTOS, on line 166 or an Input/Output to Servo drive signal, ITOS, on line 168 depending on which processor is attempting to access the DRAM 18 of the Servo processor. In the above example, in which the Main processor 10 is trying to access the Servo processor's DRAM, SMSSEL on line 124 is active as well as the Main address strobe MAS. In response to the activation of SMSSEL and MAS, PAL 130 activates MTOS on line 166 to cause the address and data buses of the Main and Servo processors to be connected as discussed below in detail with respect to FIGS. 4A-B. After the buses of the Main and Servo processors are connected, PAL 130 activates EXSAS on a line 170 to the PAL 164. In response to EXSAS, PAL 164 activates the Servo address strobe, SAS on line 172 to start the bus cycle. The Servo PAL 130 is responsive to the deactivation of the Main address strobe, MAS, on line 174, indicating that the Main processor has completed the access of the Servo processor's DRAM 18 by activating EXSAS and MTOS.

When one foreign memory access cycle is complete, the EBA 50 maintains ownership of the foreign bus and memory to see if another processor requests access to the same memory. For example after the Main processor 10 has completed access of the Servo's DRAM 18, the Servo PAL 130 checks for requests from the Input/Output processor 14. If no request is pending from the Input/Output processor 14 as indicated by the foreign memory access select signal SISSEL, PAL 130 deactivates EXSBGACK to the PAL 164 to release the Servo bus. PAL 130 then returns to its idle state so that another foreign memory access may be performed. If, SISSEL is asserted indicating that the Input/Output processor is requesting access to the Servo processor's DRAM 18, the PAL 130 maintains the external Servo bus grant acknowledge signal EXSBGACK to the PAL 164 active and activates ITOS, the Input/Output processor to Servo bus drive signal on line 168 to connect the Servo bus and the Input/Output processor's bus. The Servo PAL 130 can maintain access to the Servo bus only during two foreign access cycles so that after the Input/Output processor has completed its access of the Servo's memory, PAL 130 returns to its idle state to enable another processor to access a foreign memory through the EBA 50.

As shown in FIG. 2A, PAL 180 monitors the states of the Main, Servo and Input/Output processor PALs 128, 130 and 132 to activate or deactivate the EXACLR signal on line 126 as discussed above. The PAL 180 also monitors the states of the PALs 128, 130 and 132 as indicated by lines 182 in order to drive the data acknowledge signals from one processor to another processor. For example, when the Main processor is currently accessing the Servo processor's memory, PAL 180 is responsive to the Servo data acknowledge signal on line 184 to activate the main data acknowledge signal $\overline{\text{MOCDTK}}$ on line 186.

Figure 4A:
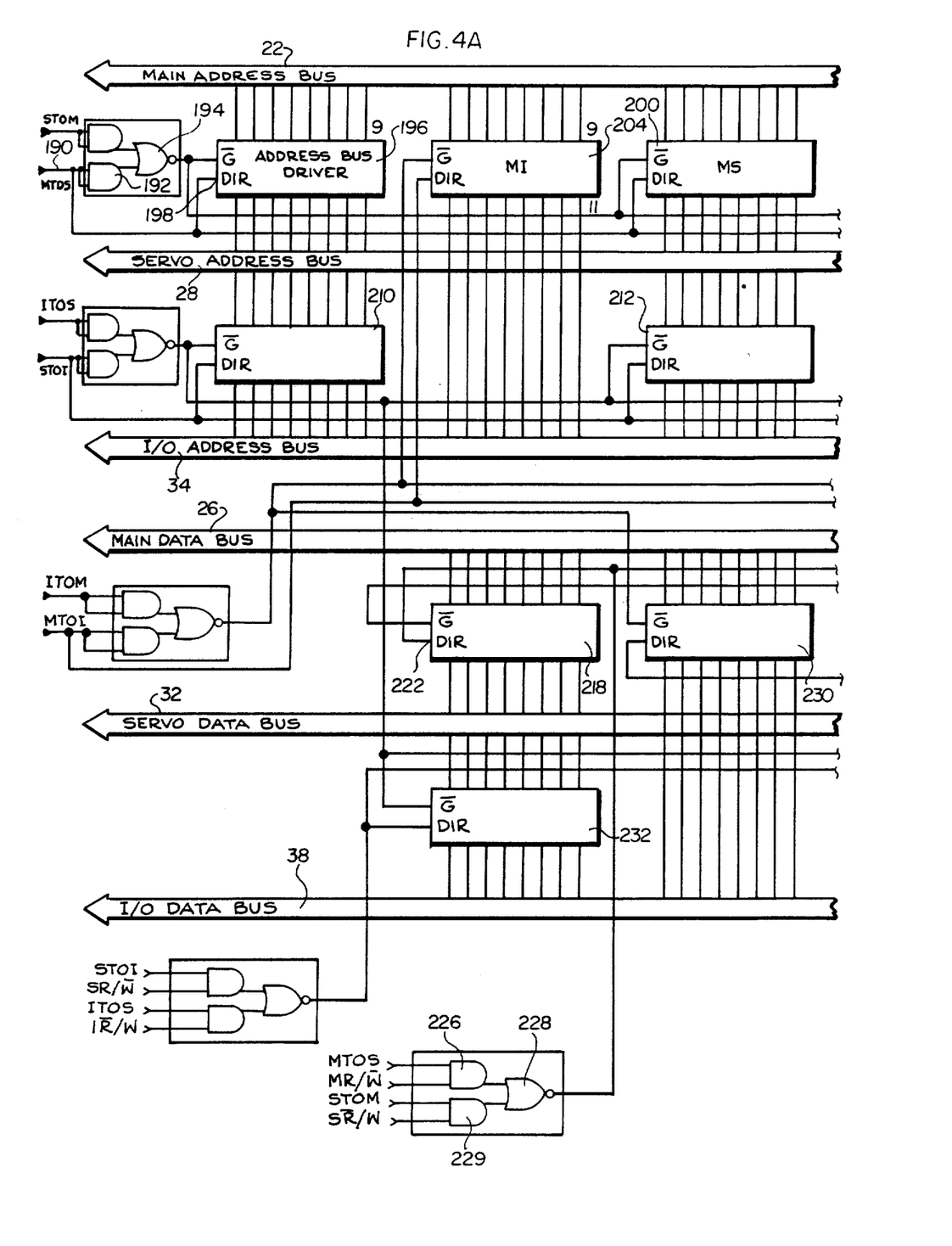
FIGS. 4A-4B are schematic diagrams of the bus drivers of the external bus arbitration system.
Figure 4B:
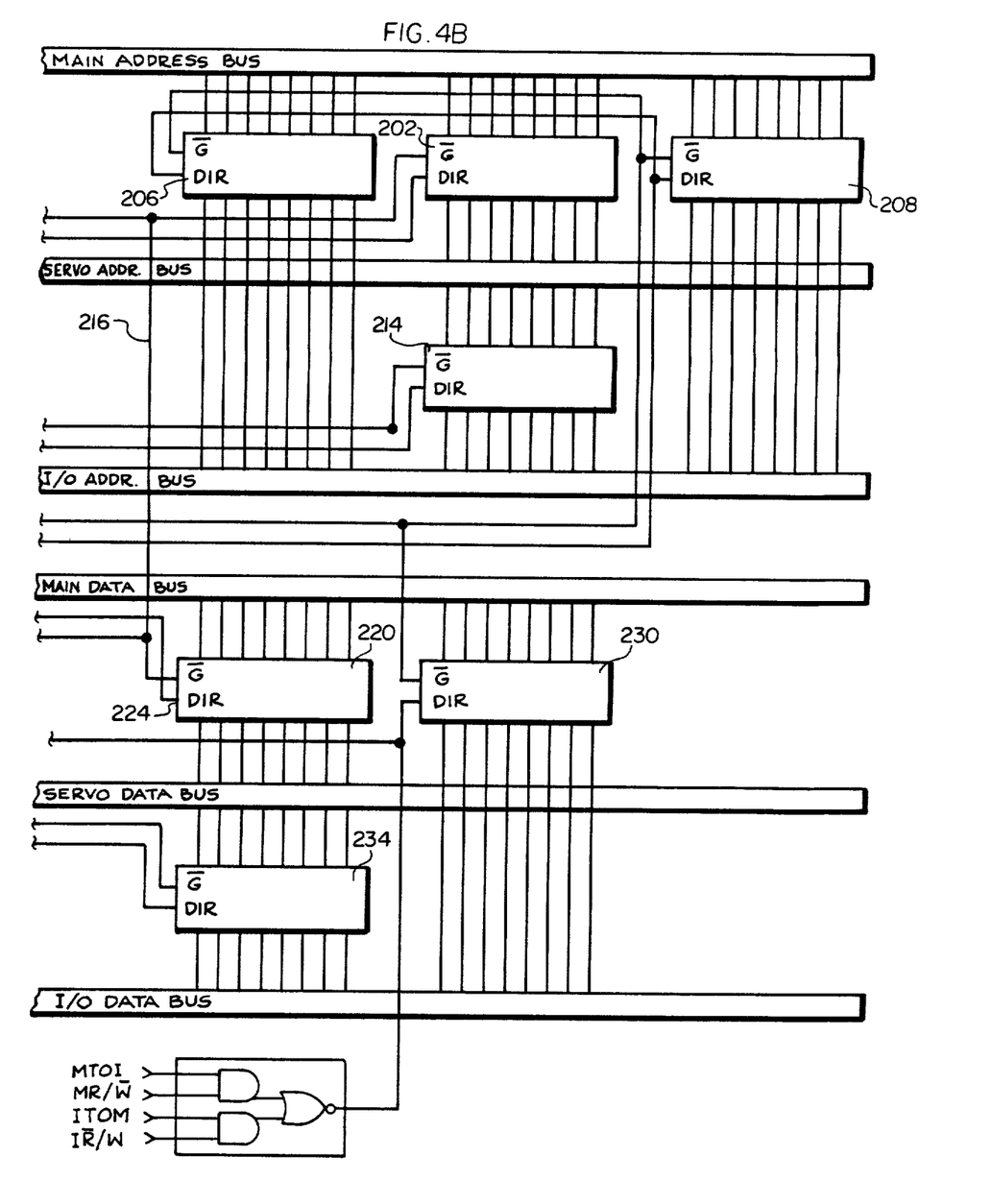

The bus drivers of EBA system 50 which connect the address and data buses of two processors together so that one processor may access the memory of another processor are shown in FIGS. 4A-B. For simplicity only, the bus drivers connecting the Main and Servo buses together will be described since the other bus drivers are identical. The Main to Servo bus driver control signal, MTOS, on line 190 is applied to an AND gate 192, the output of which is coupled to NOR gate 194. When MTOS is active, the output of gate 192 is high; whereas, the output of the NOR gate 194 is low. A low output from the NOR gate 194 gates the bus driver 196 to connect the Main address bus 22 and the Servo address bus 28. The MTOS signal on line 190 is also coupled to a direction input 198 of the driver 196 and when active, indicates that an address from the Main bus 22 is to be coupled to the Servo address bus 28. When the bus driver 196 is gated by a STOM signal such that MTOS coupled to the input 198 of the driver is not active, the driver 196 couples an address from the Servo bus 28 to the Main bus 22. The low output from the NOR gate 194 also gates the address bus drivers 200 and 202 wherein the direction of the address flow is again determined by the MTOS signal. The bus drivers 204, 206 and 208 connect the Main address bus 22 and the Input/Output address bus 34; whereas, the bus drivers 210, 212 and 214 connect the Servo address bus and the Input/Output address bus with the drivers 204–214 operating in the same manner as driver 196.

The output of NOR gate 194 is also coupled on a line 216 to the gates of data bus drivers 218 and 220 which are gated by a low output from the NOR gate 194 to connect the Main data bus 26 and the Servo data bus 32 together. In order to determine the direction of data flow between the Main and Servo data buses 26 and 32, the MTOS signal is applied to an AND gate 226, to the other input of which is applied a Main read/not write signal MR/$\overline{W}$. When the Main processor wants to read data from the Servo processor's DRAM 18, MTOS is active as well as MR/$\overline{W}$ so that the output of the AND gate 226 is high. The high output of the AND gate 226 is coupled to a NOR gate 228 causing the output of the NOR gate to go low. The output of the NOR gate 228 is coupled to the direction input 222 of the driver 218 and the direction input 224 of the driver 220. A low input to the direction inputs 222 and 224 from the NOR gate 228 indicates that the flow of data is from the Servo data bus 32 to the Main data bus 26. Once the data on bus 32 from the DRAM 18 is transferred to the Main data bus 26 through the drivers 218 and 220, the data is stored directly in the Main processor's DRAM 16 for use by the Main processor. When the Main processor wants to write data to the Servo processor's DRAM 18, MTOS is active but MR/$\overline{W}$ is not so that the output of gate 226 is low. The low output to the NOR gate 228 from the gate 226 and a low output to the gate 228 from an AND gate 229 cause the output of the NOR gate 228 to go high. The drivers 218 and 220 respond to the high output from gate 228 by causing data to flow from the Main data bus 26 to the Servo data bus 32. The data bus drivers 230 and 232 similarly connect the Main data bus and the Input/Output processor data bus 38 whereas the bus drivers 232 and 234 connect the Servo data bus 32 and the Input/Output data bus 38.

Figure 5:
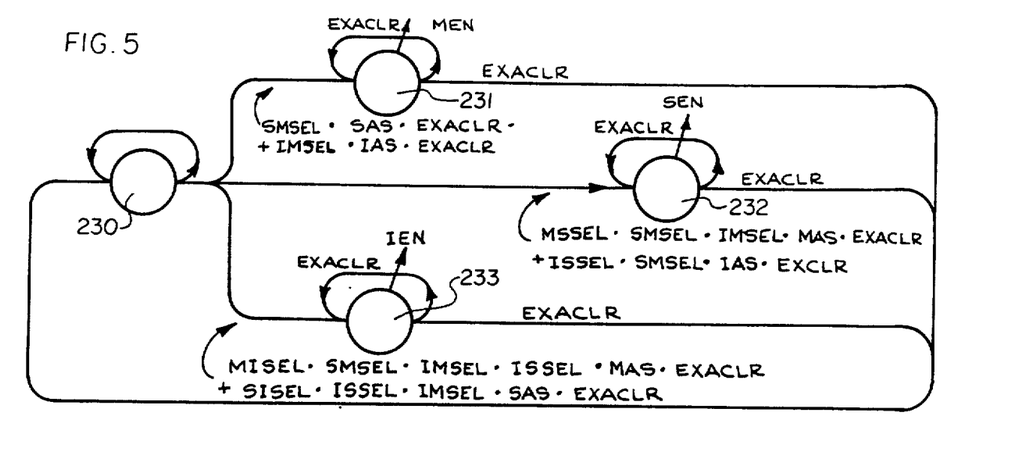
FIG. 5 is a state flow chart illustrating the logic of a PAL used in the external bus arbitration system.

PAL 110 is a finite state machine, the state flowchart of which is illustrated in FIG. 5. State 230 represents the idle state of the PAL 110. PAL 110 remains at state 230 until a request is received for access to a foreign memory. If a valid request is received for the Main processor's DRAM 16 and EXACLR is active, PAL 110 moves to state 231 and activates MEN. More specifically, at state 230 the PAL 110 determines whether SMSEL, SAS and EXACLR are active indicating a valid request for the Main DRAM 16 from the Servo processor 12 or whether IMSEL, IAS and EXACLR are active indicating a valid request for access to the DRAM 16 from the Input/Output processor 14. If so, PAL 110 activates the Main enable, MEN at state 231. When the Main PAL 128 leaves its idle state to start the external bus request phase such that EXACLR is deactivated, PAL 110 returns to its idle state 230.

When the PAL 110 is in its idle state 230 and does not receive a valid request for the Main processor's DRAM 16 but does receive a valid request for the Servo processor's DRAM 18, PAL 110 moves to state 232 to activate SEN. More specifically, if MMSEL, MAS, and EXACLR are active and SMSEL and IMSEL are not active; or, if ISSEL, IAS and EXACLR are active but SMSEL is not active, the PAL 110 at state 232 activates the Servo enable SEN coupled to the PAL 130. When the Servo PAL 130 is enabled, EXACLR is deactivated and PAL 110 returns to state 230.

When the PAL 110 is in the idle state 230 and neither a request for the Main DRAM 16 or the Servo DRAM 18 is received but a request for the Input/Output processor DRAM 14 is received, PAL 110 moves to state 233 to activate IEN. More specifically, if MISEL, MAS, and EXACLR are active but SMSEL and IMSEL and ISSEL are not active or, SISEL and SAS and EXACLR are active but ISSEL and IMSEL are not active, PAL 110 activates the Input/Output processor PAL enable, IEN, coupled to the PAL 132. When enabled, PAL 132 leaves its idle state causing EXACLR to be deactivated so that PAL 110 returns to its idle state 230.

Figure 6:
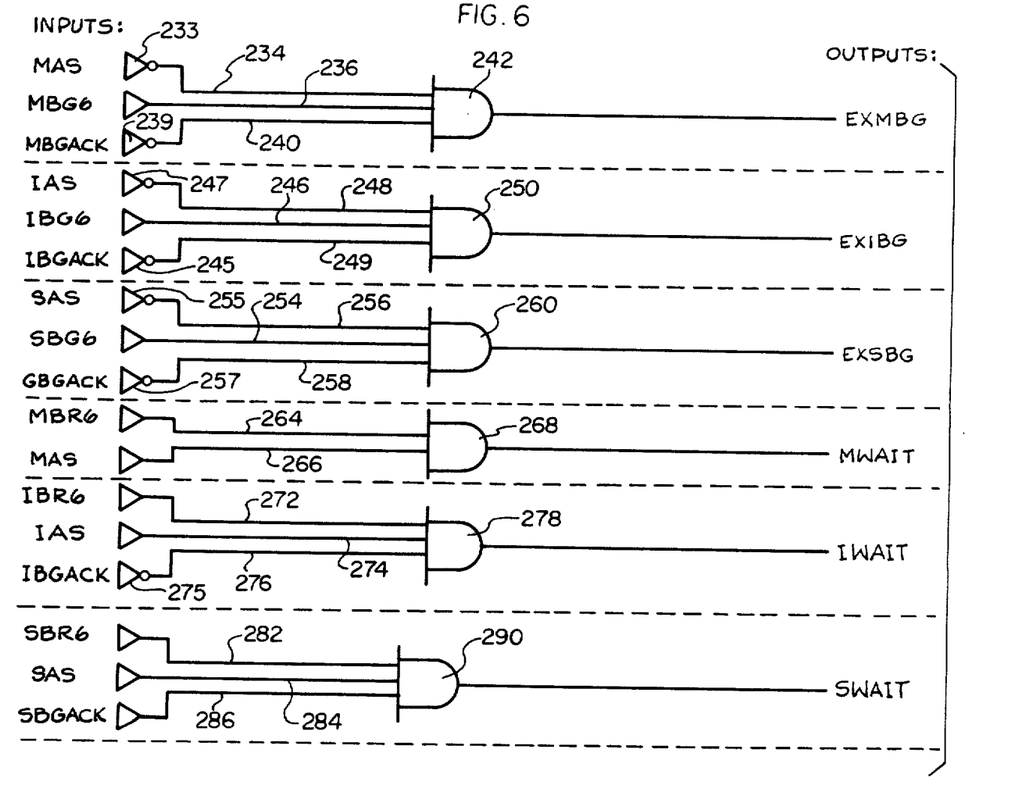
FIG. 6 is a circuit diagram illustrating the logic of a PAL used in the external bus arbitration system.

The gate equivalent of the PAL 140 is shown in FIG. 6. If MAS is not active indicating the Main processor's cycle is complete, the output of an inverter 233 on a line 234 is high. Similarly, if the MBGACK signal is not active indicating there is no current bus master, the output of an invert 239 on a line 240 is high. When lines 234 and 240 are high and a bus grant, MBG6, is received from the LBA 54 so that line 236 is high, the output of AND gate 242 goes high to activate EXMBG coupled to the sync latch 146. Similarly, if a bus grant on line 64 is received from the Input/Output processor LBA 62 so that line 246 is high; the Input/Output processor's address strobe is not active indicating a completed cycle so that the output of an inverter 247 on a line 248 is high; and there is no master on the bus of processor 14 as indicated by IBGACK being deactivated so that the output of an inverter 245 on a line 249 is high, the output of AND gate 250 goes high to activate EXIBG. If the Servo bus grant, SBG6 is active so that line 254 is high; SAS is deactivated so that the output of an inverter 255 on a line 256 is high; and SBGACK is deactivated so that the output of an inverter 257 on a line 258 is high, the output of AND gate 260 goes high to activate EXSBG.

PAL 140 also generates the xWAIT signals as follows. If the Main bus request, MBR6, is active so that line 264 is high and the Main address strobe is active so that line 266 is high, the output of AND gate 268 goes high to activate MWAIT. If the Input/Output processor bus request, IBR6, is active so that line 272 is high; the Input/Output processor address strobe is active so that line 274 is high; but the bus grant acknowledge is deactivated so that the output of an inverter 275 on a line 276 is high, the output of an AND gate 278 goes high to activate IWAIT. If the Servo bus request, SBR6, is active so that line 282 is high; the Servo address strobe, SAS, is active so that line 284 is high; and SBGACK is active so that line 286 is high, the output of AND gate 290 goes high to activate SWAIT.

Figure 7:
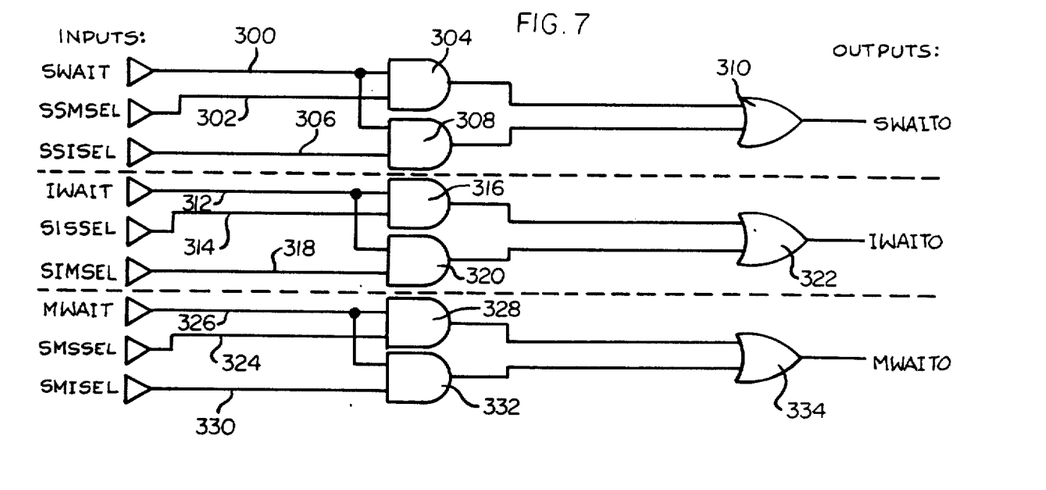
FIG. 7 is a circuit diagram illustrating the logic of a PAL used in the external bus arbitration system.

The gate equivalent of PAL 152 is illustrated in FIG. 7. If the SWAIT and SSMSEL are active indicating that the Servo is trying to access the Main processor's DRAM, lines 300 and 302 coupled to the input of an AND gate 304 are high so that the output of the AND gate is also high. Similarly, if SWAIT and SSISEL are active indicating that the Servo processor is trying to access the memory of the Input/Output processor, lines 300 and 306 coupled to the input of an AND gate 308 are high so that the output of the AND gate 308 is high. A high output from either or both of the AND gates 304 and 308 causes the output of an OR gate 310 to go high to activate SWAITO coupled to PAL 154. If IWAIT is active as well as SISSEL indicating that the Input/Output processor is trying to access the Servo processor, lines 312 and 314, coupled to the AND gate 316 are high causing the output of gate 316 to go high. Similarly, if the IWAIT signal on 312 and SIMSEL are active, indicating that the Input/Output processor is trying to access the Main processor's DRAM, lines 312 and 318 coupled to the AND gate 320 are high causing the output of the gate 320 to go high. A high output from either or both of the AND gates 316 and 320 causes the output of an OR gate 322 to go high to activate IWAIT coupled to PAL 154. When the Main processor is trying to access the memory of the Servo processor so that SMSSEL is active, line 324 is high. If line 324 is high and MWAIT is active so that line 326 is high, the output of AND gate 328 goes high. If MWAIT on line 326 is high and SMISEL is active indicating that the Main processor is trying to access the Input/Output processor's DRAM so that line 330 is also high, the output of AND gate 332 coupled to lines 326 and 330 goes high. When either or both of the outputs of AND gates 328 and 332 are high, the output of an OR gate 334 goes high to activate MWAITO coupled to PAL 154.

Figure 8:
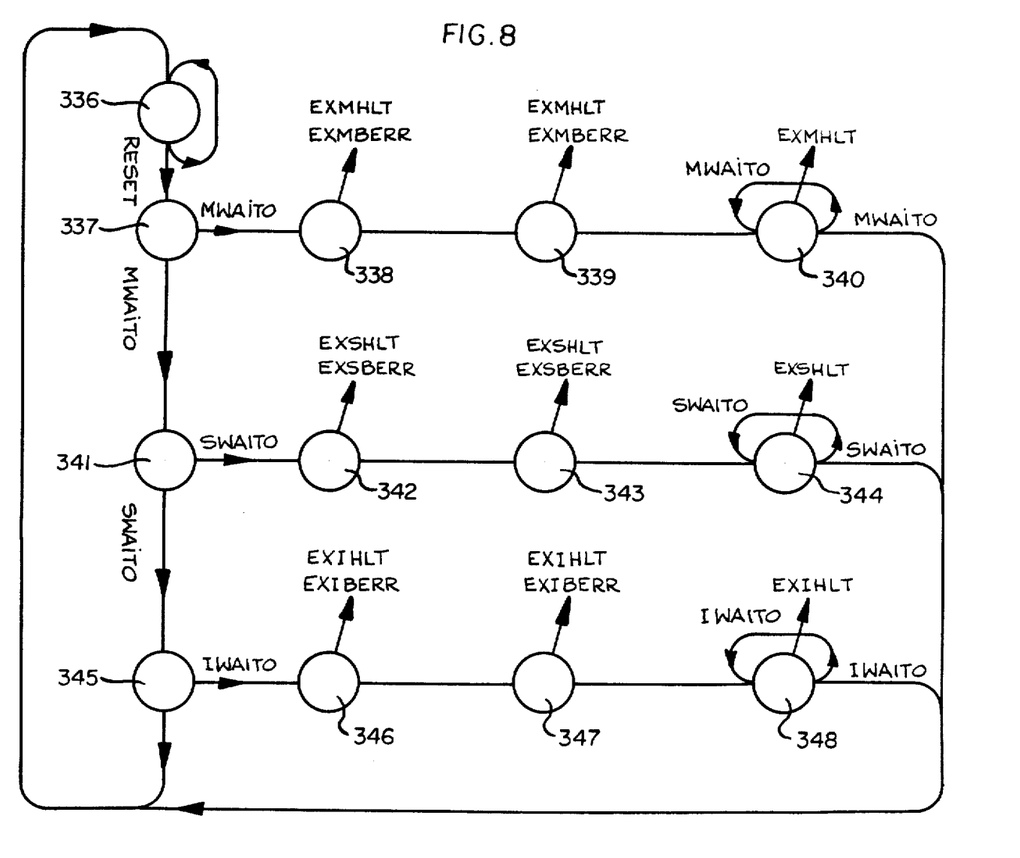
FIG. 8 is a state flow chart illustrating the logic of a PAL used in the external bus arbitration system.

PAL 154 is a finite state machine as illustrated in the state flowchart of FIG. 8. In state 336, the PAL 154 determines whether the system is reset and if not, moves to state 337. At state 337, the PAL 154 determines whether MWAITO is active and if it is, the PAL moves to state 338, outputting the signals EXMHLT and EXMBERR on the control bus 118 of the Main CPU 10. After one state count, the PAL 154 moves to state 339 to maintain active the control signals activated at state 338. After the next state count, PAL 154 moves to state 340 with the control EXMHLT maintained and the PAL determines whether MWAITO is still active. If MWAITO is still active, PAL 154 stays in state 340. However, if MWAITO is not active PAL 154 moves to state 336. If at state 337 it was determined that MWAITO was not active, PAL 154 moves to state 341 and determines whether SWAITO is active. If SWAITO is active, PAL 154 moves to states 342 and on the next state count to state 343 during which states the control signals EXSHLT and EXSBERR are active. When in state 343 and the next state count is received, PAL 154 moves to state 344 to determine whether SWAITO is still active. If not, PAL 154 returns to state 336. If it was determined at states 337 and 341 that neither the MWAITO nor the SWAITO signals were active, PAL 154 moves to state 345. At state 345 if IWAITO is active, PAL 154 moves to state 346 and on the next state count to state 347 during both of which states the PAL activates EXIHLT and EXIBERR. On the next state count after state 347, PAL 154 moves to state 348 to determine whether IWAITO is still active. If IWAITO is not active PAL 154 returns to state 336.

Figure 9:
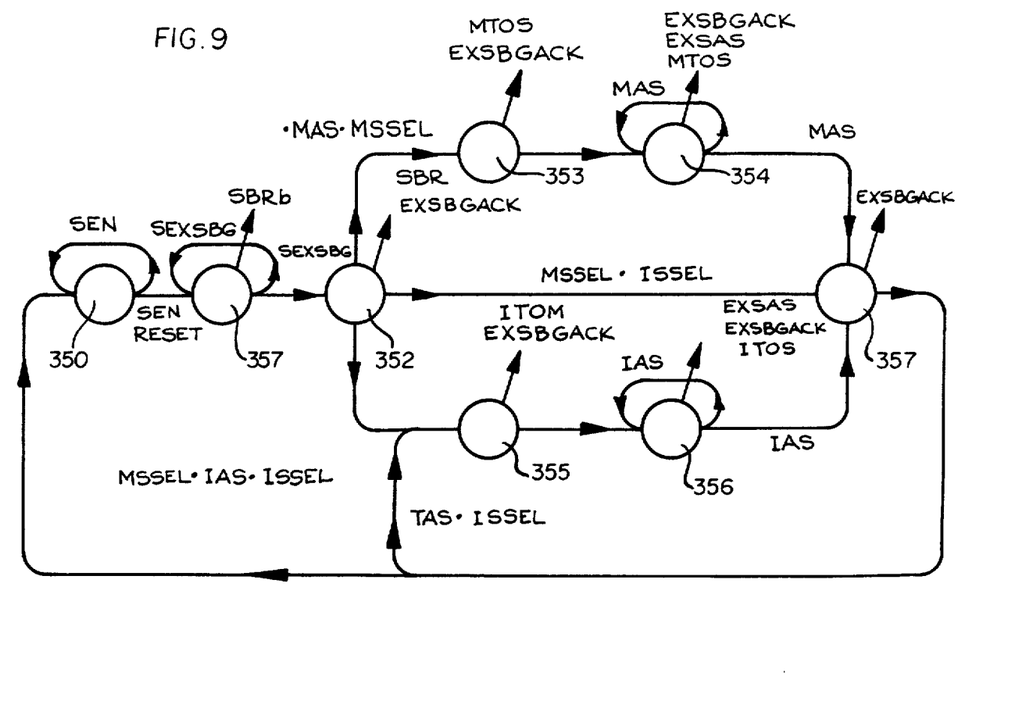
FIG. 9 is a state flow chart illustrating the logic of a PAL used in the external bus arbitration system.

The Main PAL 128, Servo PAL 130 and Input/Output PAL 132 are identical state machines so that only the Servo PAL 130 will be described with reference to FIG. 9. At state 350, PAL 130 determines whether a request from the PAL 110 was received or not. If a request, for the Servo's DRAM 18 has been received such that SEN is active, PAL 130 moves to state 351 and activates the bus request SBR6. At state 351, PAL 130 determines whether the Servo bus has been granted by monitoring SEXSBG and if so moves to state 352. At state 352 PAL 130 determines whether the Main processor 10 or the Input/Output processor 12 is requesting the Servo DRAM 18. If the Main processor 10 is trying to access the Servo processor's DRAM 18 such that MSSEL and MAS are active, PAL 130 moves to state 353 and activates MTOS and EXSBGACK. On the next state clock count the PAL 130 moves to state 354 and also activates EXSAS. When the Main processor 10 has completed its access of the Servo processor's DRAM 18, MAS is deactivated and the PAL 130 moves to state 357 maintaining EXSBGACK. If at state 357 it is determined that the Input/Output processor is not trying to access the Servo processor's DRAM, PAL 130 returns to state 350 and deactivates EXSBGACK. If at state 357 it is determined that the Input/Output processor is trying to access the Servo processor's DRAM such that ISSEL and IAS are both active, PAL 130 moves to state 355 to activate ITOM and maintain EXSBGACK. On the next state count PAL 130 moves to state 356 and outputs EXSAS. When IAS is no longer asserted indicating that the Input/Output processor has completed accessing the DRAM 18, PAL 130 again moves to state 357 and from state 357 the PAL moves back to state 350, deactivating EXSBGACK.

Figure 10:
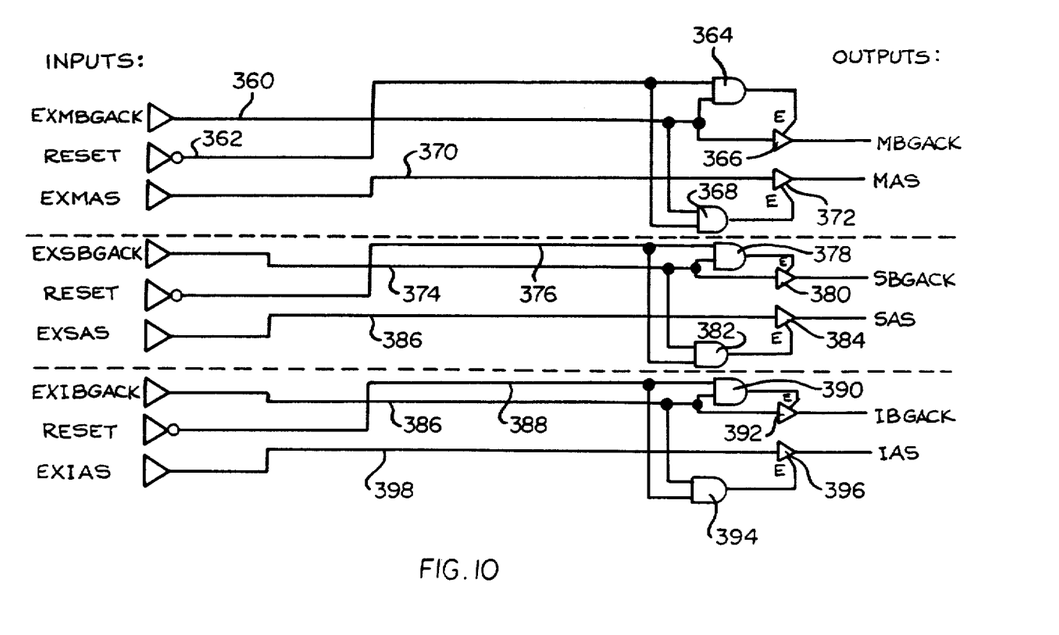
FIG. 10 is a circuit diagram illustrating the logic of a PAL used in the external bus arbitration system.

The gate equivalent of the PAL 164 is illustrated in FIG. 10. If EXMBGACK is active and the reset is not active such that line 360 and the output of an inverter 361 on a line 362 are high, the output of AND gate 364 is high to enable a tristate driver 366. When the driver 366 is enabled, MBGACK is activated. Gate 368 is enabled when gate 364 is enabled to gate a tristate driver 372 to activate MAS. Similarly, if EXSBGACK is active and the reset is not active such that lines 374 and 376 are high, the output of an AND gate 378 is high enabling a tristate driver 380. The output of the tristate driver 380 goes high when enabled to activate SBGACK. The output of AND gate 382 is high when the output of gate 378 is high to enable a tristate driver 384. When enabled, the driver 384 activates SAS. If EXIBGACK is active and the reset is not active such that lines 386 and 388 are high, the output of an AND gate 390 is high enabling a tristate driver 392. When the tristate driver 392 is enabled, the driver activates IBGACK. The output of the driver 396, when enabled, goes high to activate IAS.

Figure 11:
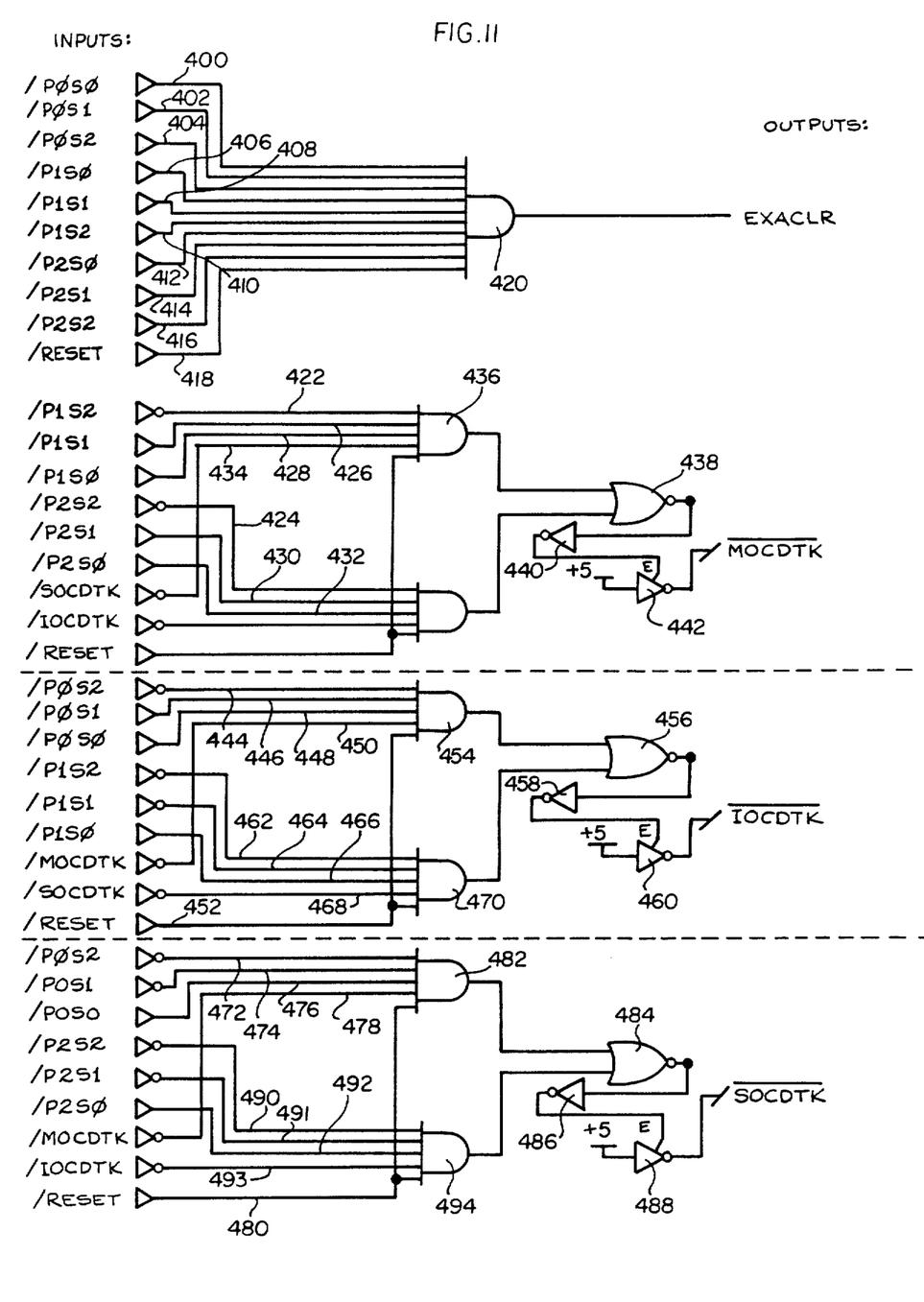
FIG. 11 is a circuit diagram illustrating the logic of a PAL used in the external bus arbitration system.

FIG. 11 illustrates the gate equivalent of PAL 180. PAL 180 monitors the state of the Main PAL 128 on lines 400, 402 and 404. PAL 180 also monitors the state of the Servo PAL 130 on lines 406, 408, 410 and the state of the Input/Output PAL 132 on lines 412, 414 and 416. The state signals on lines 400 thorugh 416 as well as the reset on line 418 are coupled to an AND gate 420 the output of which is high to activate EXACLR when all of the PALs 128, 130 and 132 are in their idle state and the reset on 418 is not active. If one of the PALs leaves its idle state such that one of the inputs on lines 400–416 goes low, the output of AND gate 420 goes low to deactivate EXACLR. When either the Servo processor or the Input/Output processor are in their fourth states, lines 422 and 424 are high as well as lines 426, 428, 430 and 432. When the Servo processor is in its fourth state and SOCDTK is asserted so that line 434 is also high, the output of AND gate 436 goes high causing the NOR gate 438 output to go low which when inverted by gate 440 enables a tristate inverter 442 to provide $\overline{\text{MOCDTK}}$ on line 186. If the Main PAL 128 is in its fourth state and MOCDTK is active but the reset on line 452 is not active, the inputs to AND gate 454 are high causing the output of AND gate 454 to go high. The high output from AND gate 454 causes the NOR gate 456 to go low and the output of an inverter 458 to go high enabling the tristate inverter 460. When enabled, the tristate inverter 460 activates $\overline{\text{IOCDTK}}$. When the Servo processor is in its sixth state and SOCDTK is active, but the reset is not active, the output of AND gate 470 goes high. A high output from gate 470 causes the output of NOR gate 456 to go low enabling the inverter 460 to activate $\overline{\text{IOCDTK}}$. When the Main processor is in its sixth state and MOCDTK is active but the reset is not such that lines 472-450 are high, the output of AND gate 452 is high causing the output of NOR gate 454 to go low. The low output of NOR gate 454 when inverted by gate 456 enables the tristate inverter 458 to activate $\overline{\text{SOCDTK}}$. Similarly, when the Input/Output processor is in its sixth state and IOCDTK is active but the reset is not so that lines 490-493 and line 480 are high, the output of AND gate 494 goes high causing the output of NOR gate 484 to go low. The low output from NOR gate 484 when inverted by gate 486 enables the tristate inverter 488 to activate $\overline{\text{SOCDTK}}$.

We claim:

1. In a machine tool control system having a plurality of processing means for outputting addresses to access stored data, said plurality of processing means including a first processing means for converting part programs controlling the operation of a machine tool into machine language; a second processing means for controlling machine tool motion statements; and a third processing means for controlling on/off machine tool functions, each processing means being coupled to a first, second and third local memory, respectively, for storing data at predefined addresses, an arbitation system for allowing one of said processing means to access the local memory of another processing means comprising:

first, second and third address decode means each coupled with said first, second and third processing means, respectively, for monitoring the addresses output by the respective processing means to provide a foreign memory select signal if an address is outside of the memory coupled to the respective processing means, said select signal identifying a foreign memory, a foreign memory being the local memory coupled to a different processing means;

means coupled to said first, second and third address decode means and responsive to the foreign memory select signal from each of said address decode means for arbitrating foreign memory access to allow one said processing means to access the local memory of another processing means, said arbitrating means providing a foreign memory access request signal to said another processing means;

each of said processing means including a means coupled thereto which is responsive to a foreign memory access request signal from said arbitrating means for providing an access grant signal if said processing means is not using the local memory coupled thereto; and means coupled to said providing means and responsive to an access grant signal from said another processing means for coupling the local memory of said another processing means to said one processing means.

2. The system of claim 1 wherein said arbitrating means is responsive to foreign memory select signals indicating that said first processing means and either of said second or third processing means are trying to access a foreign memory for allowing said first processing means to access the foreign memory before allowing either of said second or third processing means to access the foreign memory.

3. The system of claim 2 wherein said arbitrating means is responsive to a foreign memory select signal indicating that each of said second and third processing means are trying to access a foreign memory for allowing the second processing means to access the foreign memory before allowing the third processing means access.

4. In a control system having first, second and third processors which provide addresses to access stored data, each processor being coupled thorugh local address and data buses to a respective first, second and third local memory, each said local memory storing data at predefined addresses, an arbitration system for allowing any processor to access a foreign memory, a foreign memory comprising a local memory coupled with a different processor, comprising:

first, second and third address decode means each coupled through said local address buses to said first, second and third processors, respectively, for monitoring addresses output on said local address bus to provide a foreign memory select signal if a monitored address is an address in a foreign memory, said select signals identifying the processor coupled to the foreign memory;

means coupled to said address decode means and responsive to the foreign memory select signals from each of the three address decode means for arbitrating foreign memory access requests to allow one of said processors to access a local memory of another processor, said arbitrating means providing a foreign memory access request signal to said another processor;

first, second and third means coupled with said first, second and third processors, respectively, and responsive to a foreign memory access request signal provided to its respective processor from said arbitrating means for providing an access grant signal to said arbitrating means if said respective processor is not using its local memory; and means included in said arbitrating means and responsive to an access grant signal from the access grant providing means coupled with said another processor to connect the local address and data buses of said another processor to transfer address data stored in the local memory of said another processor to said one processor.

5. The system of claim 4 wherein said arbitrating means further includes means coupled to said address decode means and responsive to a foreign memory select signal identifying the last of said three processors and the memory coupled to said another processor for maintaining ownership of the local address and data buses of said another processor after data is transferred from the memory of said another processor to said one processor to connect the local address and data buses of said another processor to the local address and data buses of said last processor.

6. The system of claim 4 wherein said arbitrating means further includes means coupled to said address decode means and responsive to a foreign memory select signal identifying said another processor for forcing said another processor off its local address and data buses to allow said one processor access to the local memory of said another processor.

7. In a control system having a plurality of processors and a plurality of memories, each memory being coupled to a particular processor, each said memory being a local memory relative to the processor coupled thereto and a foreign memory relative to said other processors, each said memory storing data at predefined addresses, an arbitration system enabling a user to access a foreign memory comprising:
- at least two users coupled to each memory for accessing data stored therein, each of said users providing a user access request signal when access to a memory is required, wherein at least one of said local memories is a dynamic random access memory and one of the users coupled to said dynamic random access memory is a memory control means for periodically refreshing the data stored in the dynamic random access memory;
- a plurality of local arbitration means each coupled with both a respective processor and said users and responsive to user access request signals from said users requesting access to said memory for arbitrating requests to grant one user access if the memory is not being used by said respective processor; and
- a plurality of address decode means each coupled with a particular processor for monitoring the addresses output by said processor to provide a foreign memory select signal if an address is in a foreign memory, said select signal identifying the processor coupled to said foreign memory;
- wherein the other of said users of memories includes a foreign memory arbitration means coupled to said address decode means and responsive to foreign memory select signals from said address decode means for arbitrating foreign memory access to allow one processor to access a foreign memory, said foreign memory arbitration means providing a user access request signal to the local arbitration means of the processor coupled to said foreign memory and responsive to an access grant signal from said local arbitration means for coupling the foreign memory to said one processor, wherein the local arbitration means coupled with the processor having the dynamic random access memory is responsive to user access request signals from said foreign memory arbitration means and from said memory control means to grant access to said memory control means to grant access to said memory control means before granting access to said foreign memory arbitration means.

8. In a control system having a plurality of processors and a plurality of memories, each memory being coupled to a particular processor, each said memory being a local memory relative to the processor coupled thereto and a foreign memory relative to said other processors, each said memory storing data at predefined addresses, an arbitration system enabling a user to access a foreign memory comprising:
- at least two users coupled to each memory for accessing data stored therein, each of said users providing a user access request signal when access to a memory is required;
- a plurality of local arbitration means each coupled with both a respective processor and said users and responsive to user access request signals form said users requesting access to said memory for arbitrating requests to grant one user access if the memory is not being used by said respective processor; and
- a plurality of address decode means each coupled with a respective processor for monitoring the addresses output by said processor to provide a foreign memory select signal if an address is in a foreign memory, said select signal identifying the processor coupled to said foreign memory;
- wherein one of said users of said memories includes foreign memory arbitration means coupled to said address decode means and responsive to foreign memory select signals from said address decode means for arbitrating foreign memory access to allow one processor to access a foreign memory, said foreign memory arbitration means providing a user access request signal to the local arbitration means of the processor coupled to said foreign memory and responsive to an access grant signal from said local arbitration means for coupling the foreign memory to said one processor, said foreign memory arbitration means including:
  - a plurality of first logic means each coupled with a respective processor for providing a user access request signal when enabled; and
  - a second logic means coupled to said address decode means and responsive to said foreign memory select signals from each of said address decode means for enabling the first logic means coupled with the respective processor.

9. The system of claim 8 wherein said external arbitration means further includes:
- a third logic means coupled to said plurality of said first logic means and responsive to a user access request signal from said first logic means and said foreign memory select signals to determine whether said one processor is addressing data stored in the foreign memory when the user access request signal is provided by the first logic means coupled with another processor; and
- means coupled to said third logic means and responsive thereto for preventing said another processor from accessing the foreign memory until after said foreign memory has been accessed by the one processor.

10. In a control system having first, second and third processors which output addresses to access stored data, each processor being coupled through first, second and third local address and data buses to first, second and third local dynamic memories, respectively, for storing data at predefined addresses, an arbitration system for allowing one of said processors to access a foreign memory, a foreign memory comprising a local memory coupled with another processor, comprising:
- first, second and third address decoders, each coupled with said first, second and third processors, respectively, for monitoring the addresses output on said respective processor's local address bus to provide a foreign memory select signal if an address is outside of said respective processor's memory, said select signal identifying the processor coupled to a selected foreign memory;
- external arbitration means coupled to said address decoders and responsive to said foreign memory select signals from each of said address decoders for arbitrating foreign memory access to allow one processor to access the memory of another processor, said external arbitration means providing a user access request signal to request access to the memory of said another processor;
- first, second and third memory controllers coupled with said first, second and third local memories, respectively, for periodically refreshing the respective local memory coupled thereto, each of said memory controllers providing a user access request signal to gain access to the respective local memory;

first, second and third local arbitration means coupled to said first, second and third processors, respectively, the external arbitration means, and said first, second and third memory controllers, respectively, and responsive to said user request signals for access to said processor's memory for transmitting an access request signal to said processor, each local arbitration means being responsive to the processor coupled thereto for providing a grant signal to the user having the highest priority to allow said user to access the local memory of the processor coupled thereto.

11. The system of claim 10 wherein said external arbitration means includes means responsive to a grant from a local arbitration means for connecting the local address and data buses of the one processor with the local address and data buses of said another processor to transfer data from the local memory of said another processor to the one processor.

12. The system of claim 11 wherein said external arbitration means includes means coupled to said address decoders for monitoring said foreign memory select signals to force said another processor off its local address bus in response to receiving a foreign memory select signal identifying said another processor when said external arbitration means is providing a user access request signal to the local arbitration means coupled with said another processor.

* * * * *